3,401,039
ANIMAL FEED

Richard S. Gordon, St. Louis, and Lawrence J. Machlin, Creve Coeur, Mo., assignors to Monsanto Company, St. Louis, Mo., a corporation of Delaware
No Drawing. Continuation-in-part of application Ser. No. 162,192, Dec. 26, 1961. This application June 11, 1965, Ser. No. 463,351
14 Claims. (Cl. 99—2)

This application is a continuation-in-part of application Ser. No. 162,192, filed Dec. 26, 1961, by the present applicants, now abandoned.

This invention relates to animal feeds and provides a feeding procedure for increasing weight gain and improving feed efficiency.

The novel feed compositions are useful in feeding both ruminant animals and the monogastric animals. The new compositions stimulate the activity of the rumen microfluora and thereby improve digestibility coefficients and increase the nitrogen retention. The novel feed compositions also increase the weight gain of poultry fed thereon. In both ruminant and non-ruminant animals cellulosic components are essential and the new compositions aid in the conversion of the cellulose into a form more readily assimulated.

It has been found that normal feed compositions for both ruminant and non-ruminant animals can be made more effective if supplemented by the addition of linear aliphatic alcohols having from 4 to 22 carbon atoms. The alcohols may be either primary or secondary, but the primary alcohols are the most effective. Both saturated and unsaturated alcohols may be used, or mixtures as obtained by saponification of animal or vegetable oils followed by reduction of the carboxylic acids to the alcohols. Preferably the alcohol mixture so formed will contain at least 60% of the straight chain primary and secondary alcohols, not more than 20% of other alcohols and not more than 20% by weight of non-alcoholic organic compounds.

It is known that the more effective animals feeds contain a substantial amount of protein. In order to provide the animals with their energy requirements the feed should contain sources of calories other than the protein. In this manner the protein present will be used most effectively in building tissue. The addition of alcohols will provide the necessary energy and at the same time stimulate the assimilation of protein as above described.

It has been found that efficient poultry feeds should contain from 20 to 40% protein and a calorie (calories per pound of feed) to protein (percent in total feed) ratio of at least 40 and preferably above 48. The addition of the alcohols as described will facilitate this objective.

Although the use of the alcohols of the above-described physical characteristics provides most effective products when used in feeds of the specified calorie-protein relationship, this is merely a useful method of identifying a group of feed stuffs which, being deficient in calories, can be benefited by the practice of this invention. There are, however, other feed stuffs which may be of relatively high calorie-protein ratio and yet can be improved by the addition of the long chained alcohols.

Although the alcohols may be used in impure form admixed with other alcohols or other organic compounds, many of the useful alcohols are available in relatively pure form, for example n-decanol, n-octadecanol, n-hexadecanol, n-tetradecanol, n-pentanol, n-dodecanol, 2-octanol, n-docosanol, n-butanol, sec-butanol, n-heptanol-3, eicosanol, n-nonyl, 2-nonanol and isodecanol (mixed isomers).

In the practice of this invention from 0.01 to 12 percent by weight of the total feed will be the straight chain alcohols with 4 to 22 carbon atoms. Preferred practice may utilize from one to eight percent by weight of the said alcohols.

To demonstrate the benefits to be derived from the practice of this invention poultry feeding experiments were conducted using the following basal diet:

| Ingredient: | Weight percent |
|---|---|
| Assay protein ADM | 35.00 |
| Wheat middlings | 40.91 |
| Fishmeal (menhaden) | 8.40 |
| Corn distillers solubles | 3.00 |
| Dehydrated alfalfa meal | 3.00 |
| Calcium carbonate | 2.90 |
| Dicalcium phosphate | 2.20 |
| Choline concentrate (25%) | 1.10 |
| MHA [1] | 0.70 |
| Glycine | 0.30 |
| Vitamins B and K | 0.50 |
| Iodized salt | 0.50 |
| Aureomycin concentrate | 0.14 |
| Penicillin concentrate | 0.14 |
| Coccidistat | 0.12 |
| Nitrofurazone concentrate | 0.06 |
| Vitamin A (10,000 IU/g.) | 0.08 |
| Vitamin D (7500 ICU/g.) | 0.30 |
| Trace mineral mixture | 0.20 |
| Santoquin [2] | 0.02 |
| Corn oil | 0.70 |
| Total | 100 |
| Calories per lb. | 771 |
| Protein (percent) | 45.5 |
| C/P | 17.1 |

[1] Registered trademark for calcium salt of 2-hydroxy-4-methylthiobutyric acid.
[2] Registered trademark for an antioxidant, 6-ethoxy-2,2,4-trimethyl-1,2-dihydroquinoline.

Well-replicated lots of chicks at varying ages were fed the basal feed supplemented with the alcohols and in some instances with corn oil. The following table sets forth the observed data.

| Parts added to 10 parts of basal diet | | Compound (name) | Average weight gain (g.) |
|---|---|---|---|
| Corn oil | Compound | | |
| | 0.0 | Control | 91 |
| | 1.0 | n-Dodecanol | 218 |
| | 1.0 | n-Octadecanol | 115 |
| | 1.0 | n-Hexadecanol | 158 |
| | 1.0 | n-Tetradecanol | 154 |
| | 1.0 | n-Docosanol | 110 |
| | 1.0 | n-Pentanol | 159 |
| 2.0 | 0.5 | Isodecanol | 146 |
| 2.0 | 0.5 | 2-octanol | 152 |

It will be noticed from the following data that alcohols which are branch-chained do not provide the same beneficial result.

| Parts added to 10 parts of basal diet | | Compound (name) | Average weight gain (g.) |
|---|---|---|---|
| Corn oil | Compound | | |
| 2.0 | 0.5 | 2,6-dimethyl heptanol | 63 |
| 2.0 | 0.5 | 4-methyl-2-pentanol | 89 |
| 2.0 | 0.5 | Trimethyl hexanol | 45 |
| | 1.0 | n-Docosanoic acid | 86 |
| 2.0 | 0.5 | 5-ethyl-10-methyl-8-undecanol | 50 |
| 2.0 | 0.5 | 2-ethyl hexanol | 96 |
| 2.0 | 0.5 | 2-propyl heptanol | 92 |

In the formulation of complete poultry feeds it is conventional to include supplemental nutrients and medicaments. Minerals such as limestone, rock phosphate, trace metal salts of zinc, magnesium, iron, manganese, copper and potassium may be added, in the form of salts of the sulfur and phosphorus acids. Antibiotics such as aureomycin and penicillin provide an invaluable function.

Trace nutrients, such as the vitamins, particularly A and D, are always beneficial and sometimes essential. Supplemental amino acids, such as methionine, cystine and arginine or the corresponding "hydroxy analogues" (hydroxyl groups replacing the amino groups) may be present to provide for specific amino acid deficiencies. Coccidistats and other specific medicaments for parasitic nematodes and helminths may also be added.

To demonstrate the beneficial result of the practice of this invention with ruminant animals, metabolism studies were conducted by feeding sheep conventional diets supplemented with four percent of the alcohols described in the following tables. In these studies, measurements were made of percent of "fiber" in the feed which is assimilated by the animal, the percentage of "dry matter" which the animal digests, and the percent of the "nitrogen" of the feed assimilated by the sheep. The "nitrogen retention" is the grams per day of nitrogen retained by the animal, and is "indicative of the growth of protein tissue." The following tables demonstrate the observed data on sheep of different age groups.

| Alcohol | Digestibility coefficients | | | Nitrogen retained |
|---|---|---|---|---|
| | Fiber | Dry matter | Nitrogen | |
| Control | 27.4 | 63.3 | 80.5 | 7.00 |
| Tetradecyl | 26.7 | 64.0 | 83.5 | 12.10 |
| Decyl | 26.2 | 61.3 | 82.6 | 12.90 |
| Lauryl | 35.2 | 65.9 | 82.5 | 8.65 |
| Control | 30.7 | 64.5 | 80.1 | 2.08 |
| Oleyl | 30.7 | 62.6 | 79.9 | 5.56 |
| Cetyl | 30.7 | 63.8 | 80.6 | 4.48 |

An essential component in animal feeds is the cellulosic roughage component. By the expression "cellulosic roughage" it is intended to refer to any nutrient component which contains at least 5% fiber. The fiber is principally cellulose which may also contain lignin chemically bound thereto. Typical high fiber containing feed components include hay, straw, cottonseed hulls, cotton mill wastes, beet pulp, silage, ground corn cobs, corn stalks, oats, barley, cereal brans, and cereal middlings. One or more of these cellulosic roughage components is essential in balanced animal feeds and at least 0.5% by weight is included, and as much as 60% or more may be used in ruminant feeds. However, in some areas cattle are fed with diets consisting entirely of barley and/or oats or substantially entirely of these high fiber cereals. Requirements for poultry feeds are lower, the maximum being from 5 to 10 percent.

In the preparation of animal feeds at least one cellulosic component is used and this component is preferably present in excess of 2% by weight although it may greatly exceed this preferred minimum content. The higher concentrations of fiber containing components are conventional in ruminant feeds, and are desirable because of their high fiber content and because the ruminant animal is especially able to digest such cellulosic components.

The protein containing components of the feed may consist of whole grains, such as corn, wheat, barley, oats, rye, millet and alfalfa; the processed grains, such as cottonseed meal, corn meal, soybean meal, linseed meal and other waste products from the oil-expressing industries; the proteins of animal origin, such as casein, gelatin, fish meal and slaughterhouse wastes.

The ruminant feeds may contain natural oils including animal fats, such as beef tallow, mutton tallow; fish oils including eel, herring, menhaden, tuna and salmon oil; and whale oil. The vegetable oils are usually of higher unsaturated acid content and are therefore generally liquid, for example soybean oil, sunflower oil, olive oil, safflower oil, corn oil, peanut oil, cottonseed oil, rice oil, millet oil, wheat germ oil and palm oil. Any of these may be included in the feed.

An optional component of the animal feeds is a non-toxic antioxidant, for example the quinolines, such as 6-ethoxy-2,2,4-trimethyl-1,2-dihydroquinoline. These substances tend to preserve vitamins and the unsaturation in oils by minimizing the oxidation which normally occurs during the preparation, storage and use of the animal feeds. In the feed composition the use of from 0.001 to 0.1% by weight of the non-toxic antioxidant has been found to enable the stabilization of the unsaturation and to preserve the nutrient value of the feed during preparation, storage and use of the feed.

Complete balanced ruminant feeds may contain, if desired, in addition to cellulosic roughage and proteinaceous nutrients other components, for example minerals, such as bone meal, salt and the various trace minerals including salts of zinc, copper, manganese, magnesium, cobalt, iodine and iron. Antibiotics, steroids, anthelmintics and other medicants may be used. Various vitamins, particularly A, B, E and D complexes may be added to provide deficiencies in these vitamins incident to the selection of the various components of the complete feed. Stilbestrol is another optional component. Other basic nutrients such as casein, other milk by-products, and synthetic chemicals such as urea, may be used if desired or if they are necessary to satisfy the requirements of a complete feed. The various physical operations of mixing, grinding and packaging are well known to one skilled in the art.

Although the benefits of the invention are described with respect to specific examples, it is not intended that the details thereof shall be limitative to the extent that they are encountered in the following claims.

What is claimed is:

1. An animal feed comprising a cellulosic feed component and a linear aliphatic alcohol having 4 to 22 carbon atoms and having a maximum of one —OH group, said alcohol being present in the feed in the amount of 0.01 to 12 percent by weight.

2. An animal feed comprising a cellulosic feed component, a proteinaceous nutrient and a linear aliphatic alcohol having 4 to 22 carbon atoms and having a maximum of one —OH group, said alcohol being present in the feed in the amount of from 0.01 to 12 percent by weight.

3. An animal feed comprising a cellulosic feed component and a mixture of alcohols, at least 20 percent of said mixture being linear aliphatic primary alcohols having from 4 to 22 carbon atoms and having a maximum of one —OH group, said feed containing from 0.01 to 12 percent by weight of said linear aliphatic primary alcohols.

4. An animal feed comprising a cellulosic feed component, a proteinaceous nutrient and from one to eight percent by weight of decanol based on the total feed content.

5. An animal feed comprising a cellulosic feed component, a proteinaceous nutrient and from one to eight percent by weight of tetradecanol, based on the total feed content.

6. An animal feed comprising a cellulosic feed component, a proteinaceous nutrient and from one to eight percent by weight of dodecanol, based on the total feed content.

7. An animal feed comprising a cellulosic feed component, a proteinaceous nutrient and from one to eight percent by weight of octadecanol, based on the total feed content.

8. The method of raising animals which comprises feeding said animals a composition comprising a cellulosic component and a linear aliphatic alcohol having 4 to 22 carbon atoms and having a maximum of one —OH group, said alcohol being present in the amount of from 0.01 to 12 percent by weight of the total feed.

9. The method of raising animals which comprises feeding said animals a composition comprising a cellulosic feed component, a proteinaceous nutrient and a linear aliphatic alcohol having four to 22 carbon atoms and having a maximum of one —OH group, said alcohol being present in the amount of from 0.01 to 12 percent by weight of the total feed.

10. The method of raising animals which comprises feeding said animals a composition comprising a cellulosic feed component and a linear aliphatic primary alcohol having four to 22 carbon atoms and having a maximum of one —OH group, said alcohol being present in the amount of from 0.01 to 12 percent by weight of the feed.

11. The method of raising animals which comprises feeding said animals a proteinaceous nutrient and from one to eight percent by weight of decanol based on the total feed content.

12. The method of raising animals which comprises feeding said animals a proteinaceous nutrient and from one to eight percent by weight of tetradecanol based on the total feed content.

13. The method of raising animals which comprises feeding said animals a proteinaceous nutrient and from one to eight percent by weight of dodecanol based on the total feed content.

14. The method of raising animals which comprises feeding said animals a proteinaceous nutrient and from one to eight percent by weight of octadecanol based on the total feed content.

References Cited

UNITED STATES PATENTS

| 3,248,289 | 4/1966 | Shinozaki et al. | 99—2 X |
| 1,958,295 | 5/1934 | Christensen et al. | 99—2 |
| 3,186,909 | 6/1965 | McMurtry et al. | 99—2 |
| 2,796,380 | 6/1957 | Maietta | 99—11 |

FOREIGN PATENTS 852,189   10/1960   Great Britain.

OTHER REFERENCES

Merck Index, 7th ed., pp. 754, 743 and 977, Merck and Co., Inc., Rahway, N.J. (1960).

Morrison, Feeds and Feeding, pp. 1083–84, The Morrison Publishing Co., Ithaca, N.Y. (1957).

Zittle et al., Effect of Aliphatic Alcohol on Bovine Alkaline Phosphatases, pp. 419–424, reprinted from Archives of Biochemistry and Biophysics, vol. 37, No. 2, June 1952.

A. LOUIS MONACELL, *Primary Examiner.*

J. M. HUNTER, *Assistant Examiner.*